United States Patent Office.

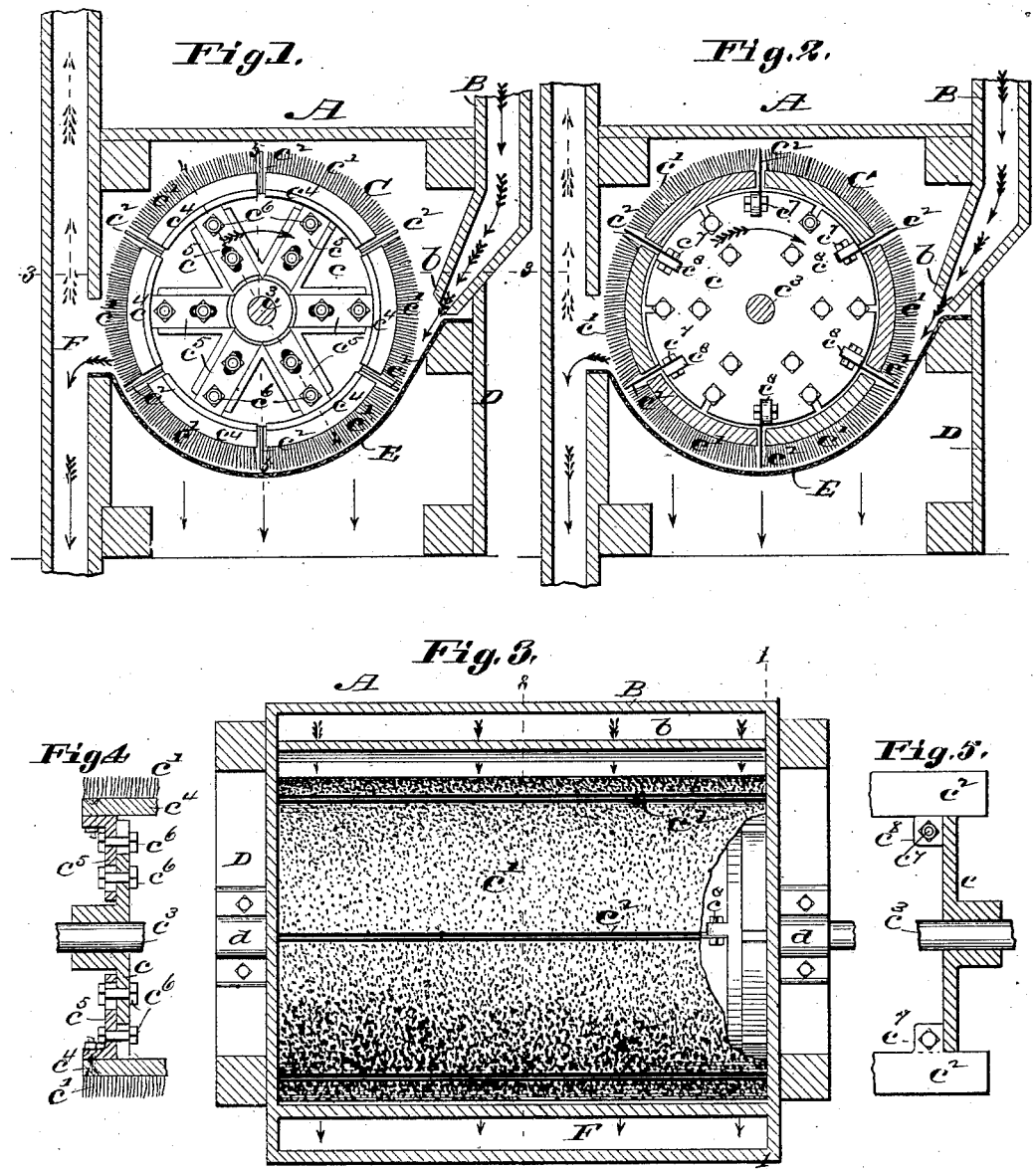

THOMAS McCUDDEN, OF ST. LOUIS, AND ALFRED F. SHEARLOCK, OF FESTUS, ASSIGNORS OF ONE-THIRD TO DANIEL FOLEY, OF ST. LOUIS, MISSOURI.

WHEAT-SCOURER.

SPECIFICATION forming part of Letters Patent No. 315,155, dated April 7, 1885.

Application filed July 7, 1884. (No model.)

*To all whom it may concern:*

Be it known that we, THOMAS MCCUDDEN, of St. Louis, Missouri, and ALFRED F. SHEARLOCK, of Festus, Jefferson county, Missouri, have jointly made a new and useful Improvement in Wheat-Scourers, of which the following is a full, clear, and exact description, reference being had to the annexed drawings, making part of this specification, in which—

Figure 1 is vertical cross-section on the line 1 1 of Fig. 3; Fig. 2, a vertical cross-section on the line 2 2 of Fig. 3; Fig. 3, a horizontal section on the line 3 3 of Fig. 1; Fig. 4, a sectional detail on the line 4 4 of Fig. 1, and Fig. 5 a sectional detail on the line 5 5 of Fig. 1.

The same letters of reference denote the same parts.

The present improvement relates to the construction and combination of parts hereinafter described and claimed.

A, Figs. 1, 2, 3, represents the improved device.

In place of delivering the wheat to the scourer at the end thereof, as hitherto has been the practice, the wheat is delivered to the scourer at the side thereof, and to this end the wheat is delivered through the spout B, whose mouth $b$ in width extends the length of the scourer, substantially as shown in Fig. 3.

The scourer C consists of the ends or heads $c\ c$, the brushes $c'\ c'$, and the beaters $c^2\ c^2$. The heads $c\ c$ are attached to the shaft $c^3$, which in turn is held and adapted to be rotated in suitable bearings, $d\ d$, of the casing D.

In place of a single brush extending around the cylinder, a series of brushes, $c'\ c'$, are employed. These brushes are attached to the curved lags $c^4\ c^4$, Figs. 1, 4, which curved lags in turn, and by means of the arms $c^5\ c^5$, are attached to the heads $c\ c$, and so as to be radially adjustable thereon—that is, when the brushes become worn they can be set radially outward from the shaft $c^3$ and by means of the bolts $c^6$ be fastened at any desired point of adjustment with reference to the center of the scourer.

The beaters $c^2$ are, by means of the bolts $c^7$, fastened to the lugs $c^8$ upon the heads $c$, substantially as shown in Figs. 2, 3, 5. The scourer rotates within the concave E. The concave is composed of wire-cloth—such as wire-gauze—and it extends beneath the scourer throughout its length, and the wheat to be scoured is delivered between the scourer and the concave, as indicated by the arrows, Figs. 1, 3, the wheat passed downward between the scourer and the concave, and is finally delivered into the spout or chamber F, Figs. 1, 2, 3, and, by means of the customary suction-blast, (the means for generating which are not shown,) the particles loosened from the wheat are drawn upward through the spout or chamber F, as indicated by the arrows in broken lines in Figs. 1, 2, and the wheat is received below in the customary manner. The effect of this mode of delivering the wheat to the scourer is, the wheat is scoured more thoroughly than in the ordinary way.

The beaters $c^2$ are useful in detaching such particles from the wheat as cannot well be detached by means of the brushes $c'$.

We claim—

The combination of the spout B, the casing D, the concave E, and the scourer C, consisting of the heads $c\ c$, the shaft $c^3$, the radially-adjustable brushes $c'\ c'$, and the beaters $c^2\ c^2$, said spout being constructed to deliver the wheat along the entire length of the horizontal scourer, substantially as described.

THOMAS McCUDDEN.
ALFRED F. SHEARLOCK.

Witnesses:
WM. K. VREELAND,
JAS. S. IRWIN.